United States Patent
Ariga (10) Patent No.: US 6,175,696 B1
(45) Date of Patent: *Jan. 16, 2001

(54) CAMERA INCLUDING JAM DETECTION AND CORRECTION MECHANISM FOR AUTOMATIC FILM FEED CARTRIDGE SYSTEM

(75) Inventor: Yuichi Ariga, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/971,103

(22) Filed: Nov. 14, 1997

Related U.S. Application Data (63) Continuation of application No. 08/561,290, filed on Nov. 21, 1995, now abandoned.

(30) Foreign Application Priority Data

Nov. 29, 1994 (JP) .................................................. 6-294897

(51) Int. Cl.[7] ....................................................... G03B 1/00
(52) U.S. Cl. ............................ 396/406; 396/408; 396/409
(58) Field of Search ..................................... 396/406, 407, 396/408, 409, 410

(56) References Cited

U.S. PATENT DOCUMENTS

| 5,255,034 | * | 10/1993 | Shimada et al. | 354/173.1 |
| 5,398,090 | * | 3/1995 | Ezawa | 354/173.1 |
| 5,467,155 | * | 11/1995 | Miyazaki et al. | 354/21 |
| 5,521,667 | | 5/1996 | Egawa et al. | 396/407 |
| 5,548,359 | * | 8/1996 | Wakabayashi | 396/207 |

* cited by examiner

Primary Examiner—Eddie C. Lee
(74) Attorney, Agent, or Firm—Fitzpatrick, Cella, Harper & Scinto (57) ABSTRACT

A camera for thrusting a film from a film cartridge by rotationally driving a spool in the film cartridge has a measuring construction for measuring the amount of the film thrust from the film cartridge, a sensing construction for sensing the position of a leader of the film thrust from the film cartridge, and a determining circuit for determining whether the film is moving properly, based on the measured thrust amount of the film and the sensed position of the leader of the film.

14 Claims, 12 Drawing Sheets

| FIG. 10A | FIG. 10B |

CAMERA INCLUDING JAM DETECTION AND CORRECTION MECHANISM FOR AUTOMATIC FILM FEED CARTRIDGE SYSTEM

This application is a continuation application Ser. No. 08/561,290 filed Nov. 21, 1995, now abandoned.

BACKGROUND OF THE INVENTION

1. Field of the Invention

The present invention relates to a camera capable of sensing a film jam.

2. Description of the Related Art

A well-known type of patrone is loaded in a camera in a state where the leading end (leader) of a film protrudes therefrom. In general, when the patrone is set in a patrone chamber, the leader is drawn out to a take-up spool and a rear cover of the camera is closed, automatic loading of the film is started to take up the film. At this time, if the amount of the leader to be drawn out is too large or too small, automatic loading ends in failure, or the film is inadvertently overdrawn and exposed to light. Furthermore, when prints are obtained from an exposed and developed film (negative or positive), particularly by an automatic printing machine, they may be contrary to the intention of the photograph since the photographing conditions are not known to a photo laboratory.

Accordingly, there has recently been proposed a new type of film and film cartridge.

Figure 3:
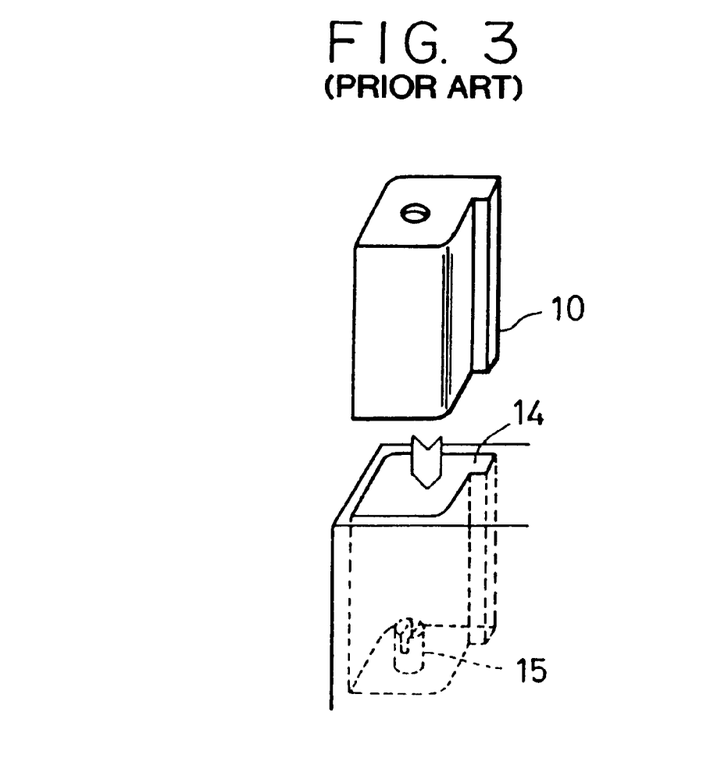
FIG. 3 is a perspective view showing a cartridge chamber of the camera shown in FIG. 2 and a film cartridge to be loaded therein.

FIG. 3 is a perspective view showing a cartridge chamber 14 of a camera using such a film, and a cartridge 10. A leading portion (leader) of the film is completely wound in the cartridge 10 without protruding outside. When the cartridge 10 is inserted in the cartridge chamber 14 of the camera, a cover (not shown) of the cartridge chamber 14 is closed for shading.

Figure 6:
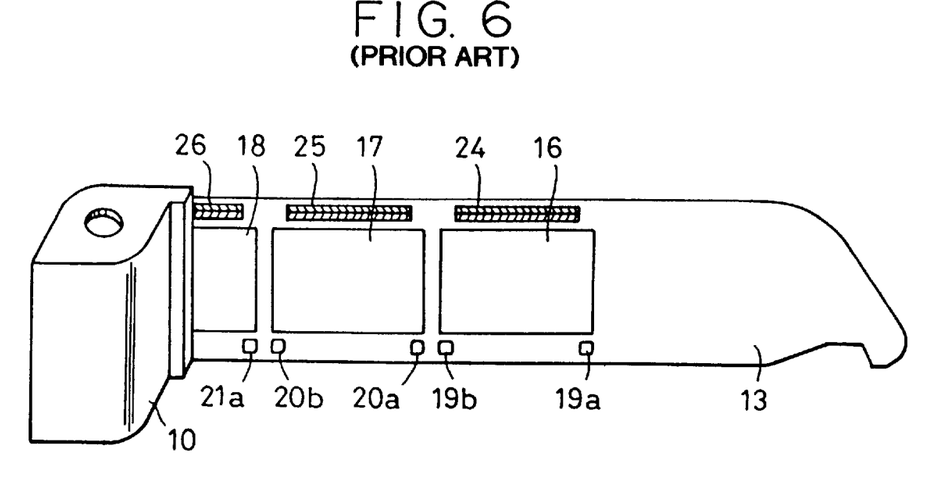
FIG. 6 is a perspective view showing a state in which a film is thrust from the film cartridge shown in FIG. 3.

FIG. 6 is a perspective view showing the states of the cartridge 10 and the film inside the camera. Numerals 13, 19a, 19b . . . 21a, and 16 to 18 respectively denote a film, perforations previously provided on the film, and frame areas to be exposed which are so defined corresponding to two perforations as illustrated that an image is formed therein. The film leader does not protrude from the cartridge 10 before loading as shown in FIG. 3. When the cartridge 10 is loaded in the camera, a fork 15 is rotated by a motor in an extruding direction (in the clockwise direction in FIG. 3) to rotate a spool 23 in the cartridge 10, by which the film 13 is extruded from the cartridge 10. This motion for extruding the film 13 from the cartridge 10 is referred to as "thrusting". Areas 24 to 26 capable of magnetic recording are provided for their respective frames, and can record in the exposed frame which the type of light source, exposure value, the date and the like.

Figure 4:
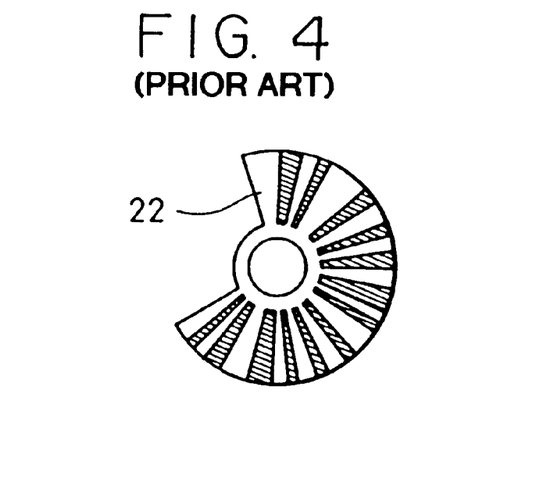
FIG. 4 is a plan view showing a data disc of the film cartridge.
Figure 5:
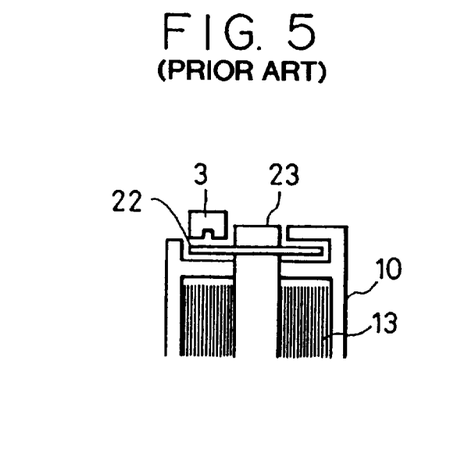
FIG. 5 is a longitudinal sectional view of FIG. 3.

This type of cartridge is provided with a disc, referred to as "data disc", on which the type of the film, the number of frames to be exposed and the ISO speed are recorded in a bar code. FIG. 4 is a plan view of a data disc 22, and FIG. 5 is a longitudinal sectional view of a part of the cartridge 10 adjacent to the data disc 22. The data disc 22 is fixed on the spool 23 to rotate in a one-to-one relation to the rotation of the spool 23. A photoreflector 3 is placed at a position shown in FIG. 5, and information on the data disc 22 is read based on signals from the photoreflector 3 while rotating the fork 15 in the rewind direction.

The use of the above-mentioned type of film eliminates the disadvantages of the prior art.

When the cartridge is loaded in the camera, the film wound in the cartridge is thrust and slid between a pressure plate and a guide rail. The film leader, which has reached the take-up spool in the camera, is wound on the take-up spool and the film is taken up in correlation to the rotation of the take-up spool. This automatic loading ends in response to sensing of the first frame. During thrusting, the film may be caught somewhere (referred to as "jammed"), which results in loading failure.

U.S. patent application Ser. No. 670278/1991, now U.S. Pat. No. 5,521,667, suggests reducing the time taken to recover from loading failure by detecting a jam from the change in film transport speed by using a film transport speed detector located near an aperture, once rewinding the film when the jam occurs while the film is being thrust, and restarting thrusting of the film before the film is completely wound in the cartridge.

However, realization of the above suggestion requires the film transport speed detector, which increases the size and cost of the camera.

SUMMARY OF THE INVENTION

According to one aspect of the present invention, there is provided a camera comprising a measuring construction for measuring the thrust amount of a film from a film cartridge, and a sensing construction for sensing the position of a leader portion of the film, wherein the camera judges that a jam has occurred when the measuring construction measures a predetermined thrust amount of the film and the sensing construction does not sense that the leader portion of the film has moved to a predetermined position.

Accordingly, it is possible to detect a jam simply and accurately.

DESCRIPTION OF THE PREFERRED EMBODIMENTS

A detailed description of preferred embodiments of the present invention will now be given in conjunction with the accompanying drawings.

Figure 1:
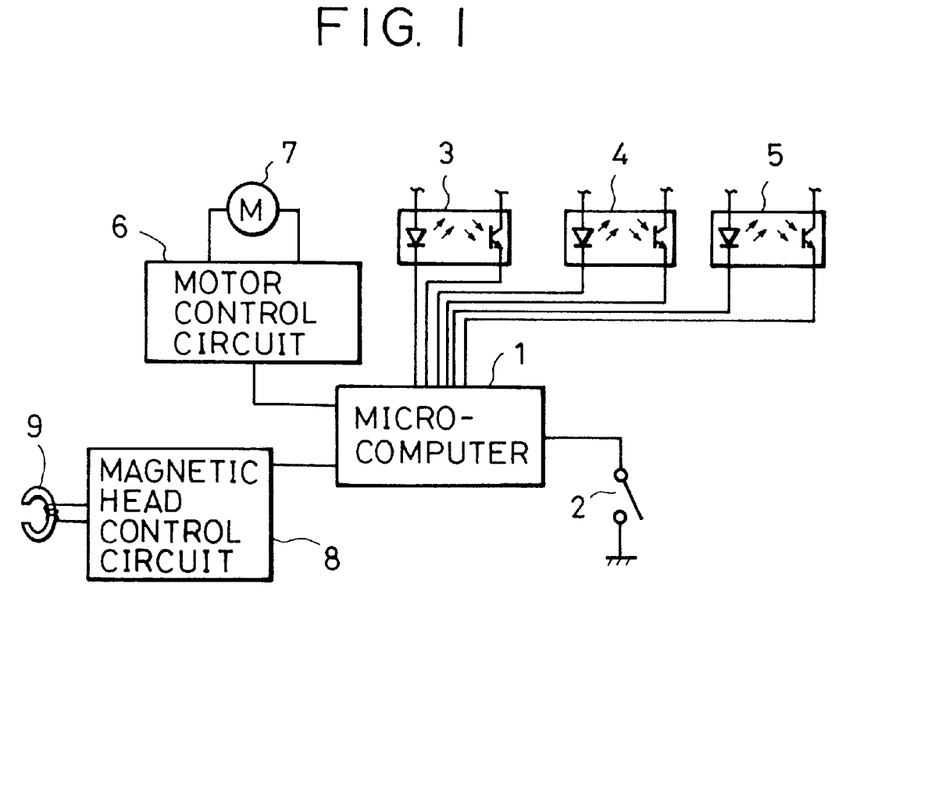
FIG. 1 is a block diagram showing a first embodiment of the present invention.

FIG. 1 is a block diagram showing a first embodiment of the present invention. Referring to FIG. 1, a microcomputer 1 exerts control on operations of various circuits, including time management and computations. A transport motor 7 switches an unillustrated idle gear by its normal and reverse rotations to perform film take-up and rewind operations, and a motor control circuit 6 controls the rotation of the motor 7. A photoreflector 3 sends data on the film type, the number of frames to be exposed and the ISO speed, which are recorded in a bar code made up of black and white lines on a data disc 22, as signals 0 and 1 to the microcomputer 1. Photoreflectors 4 and 5 detect the position of the film based on the presence or absence of reflected light. Since the outputs of the photoreflectors 4 and 5 change depending on the presence or absence of the film thereat, the microcomputer 1 judges, based on the change, the arrival of the film leader and positions of perforations. Numerals 9 and 8 denote a magnetic head and a control circuit for driving the magnetic head 9, respectively. A switch 2 is used to determine whether a cover of a cartridge chamber is opened or closed, and may be adopted to both a case in which the cover is manually closed by a user and a case in which the cover is closed electrically and automatically by the camera.

Figure 2:
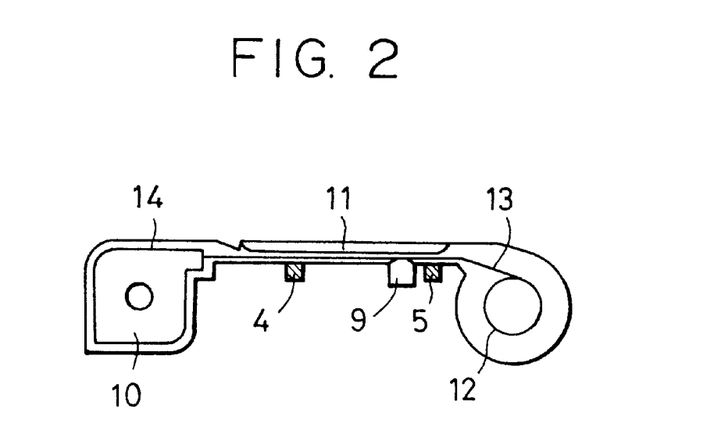
FIG. 2 is a transverse sectional view showing the principal part of a camera according to the first embodiment.

FIG. 2 is a transverse sectional view showing the principal part of the camera in film transport. Referring to FIG. 2, a photoreflector 5 detects the position of a film 13 to be exposed. The frame is placed in an exposure position by stopping the take-up operation when a perforation 20a or 19a formed on the right and below the frame reaches the photoreflector 5. After exposure, when a perforation 20b or 19b passes through a photoreflector 4 in the operation for rewinding the film in the cartridge 10, data on exposure conditions is written by the magnetic head 9. The photoreflector 4 detects the position of the film 13 when data writing is started. The photoreflectors 4 and 5 each detect the film position by using the perforations on the film.

In automatic film loading, a fork 15 is rotated in a thrust direction to rotate a spool 23, thereby sliding the film 13 between a thrust pressure plate 11 and a guide rail. The film 13 is passed through the photoreflector 4, the magnetic head 9 and the photoreflector 5 in order while still thrusting, and taken up by a take-up spool 12 subsequent to the arrival of the film leader at the take-up spool 12. When the first frame is sensed, automatic loading is completed.

However, if the film does not travel straight unfortunately, it may not slide between the pressure plate 11 and the guide rail, or may be caught by the magnetic head 9 and thereby prohibited from advancing. The following flowcharts show how quickly to sense such states and how to start thrusting over again.

Figure 7:
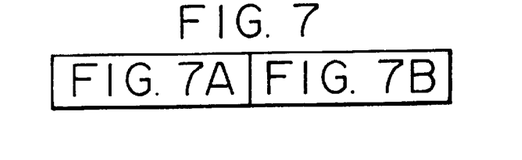
FIG. 7 consisting of FIGS. 7A and 7B, is a flowchart showing the operation of the first embodiment.
Figure 7A:
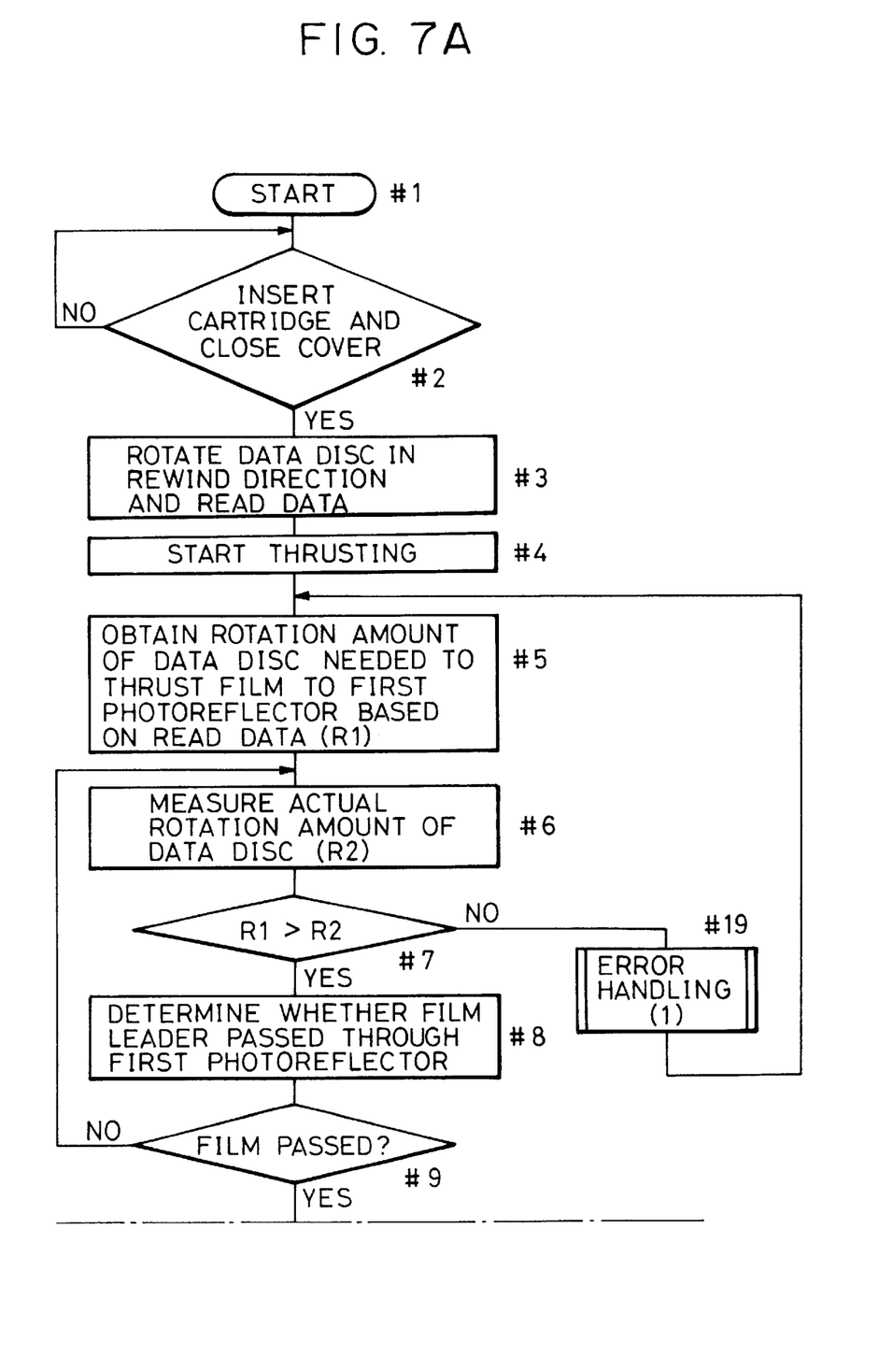
Figure 7B:
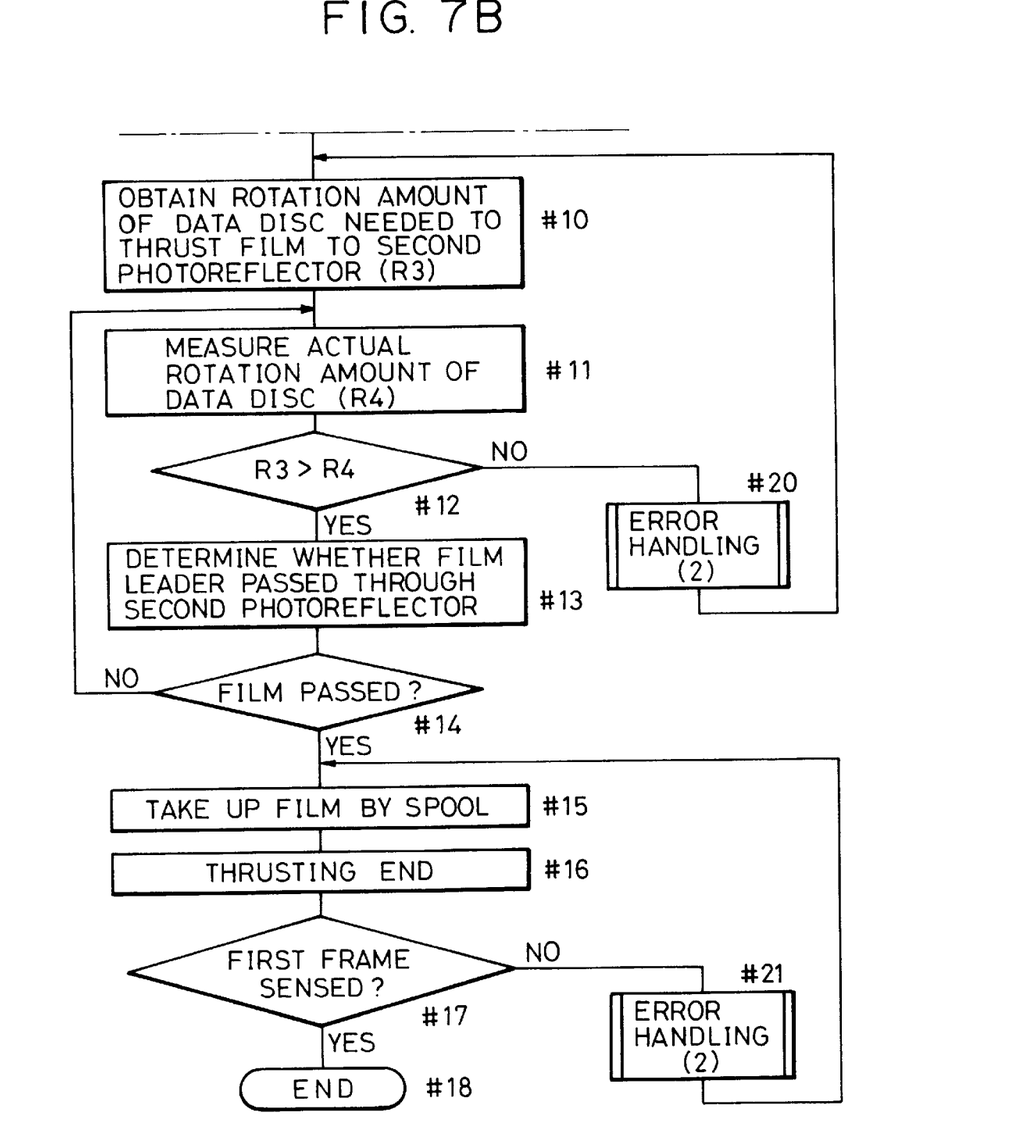

FIG. 7 is a flowchart showing an automatic loading (AL) operation of this embodiment.

In Step #2, a cartridge is inserted and the cover of the cartridge chamber is closed manually by the user or automatically by the camera. After it is confirmed that the cover is closed, the transport motor 7 is rotated in the rewind direction in Step #3, by which the power is transmitted to the fork 15 and the spool 23 through an unillustrated gear and the data disc 22 fixed on the spool 23 is also rotated. During this rotation, the contents of the bar code recorded on the data disc 22 are read by the photoreflector 3.

When the transport motor 7 is rotated in the take-up direction in Step #4, thrusting is started. Based on the number of frames read from the data disc 22, the typical film thickness, the thickness of the spool 23 on which the film 13 is wound, and the like, the thrust length of the film 13 needed to make the film leader reach the first photoreflector 4 is calculated in Step #5. Since the rotation amount of the data disc 22 and the length of the thrust film are proportional to each other, the above predetermined length is converted into a rotation amount, or the rotation amount is found from fixed values in a preset table according to the number of frames. This rotation amount is taken as R1. An actual rotation amount of the data disc 22 is measured in Step #6 by reading the bar code on the data disc 22 by the photoreflector 3. This rotation amount is taken as a first measured rotation amount R2. If the first measured rotation amount R2 is larger than the predetermined rotation amount R1, it is judged in Step #7 that the film could not reach due to a jam caused upstream from the first photoreflector 4, and then, error handling is performed in Step #19.

When it is confirmed in Steps #8 and #9 that the film leader has passed through the photoreflector 4, the rotation amount of the data disc 22 needed to make the film leader reach the second photoreflector 5 is calculated in Step #10, or the rotation amount is found from a fixed value table. The obtained rotation amount is taken as a final rotation amount R3. In Step #11, an actual rotation amount of the data disc 22 is measured by reading the bar code on the data disc 22 by the photoreflector 5. This rotation amount is taken as a second measured rotation amount R4. If the second measured rotation amount R4 is larger than the final rotation amount R3, it is determined in Step #12 that the film could not reach due to a jam caused upstream from the second photoreflector 5, and error handling is performed in Step #20.

When it is confirmed in Steps #13 and #14 that the film leader has passed through the photoreflector 5, the film take-up spool 12 is rotated to take up the film 13 in Step #15. Thrusting is ended in #16, and automatic loading is also ended if the first frame is sensed in Step #17. If the first frame is not sensed, error handling is performed in Step #21.

Figure 8:
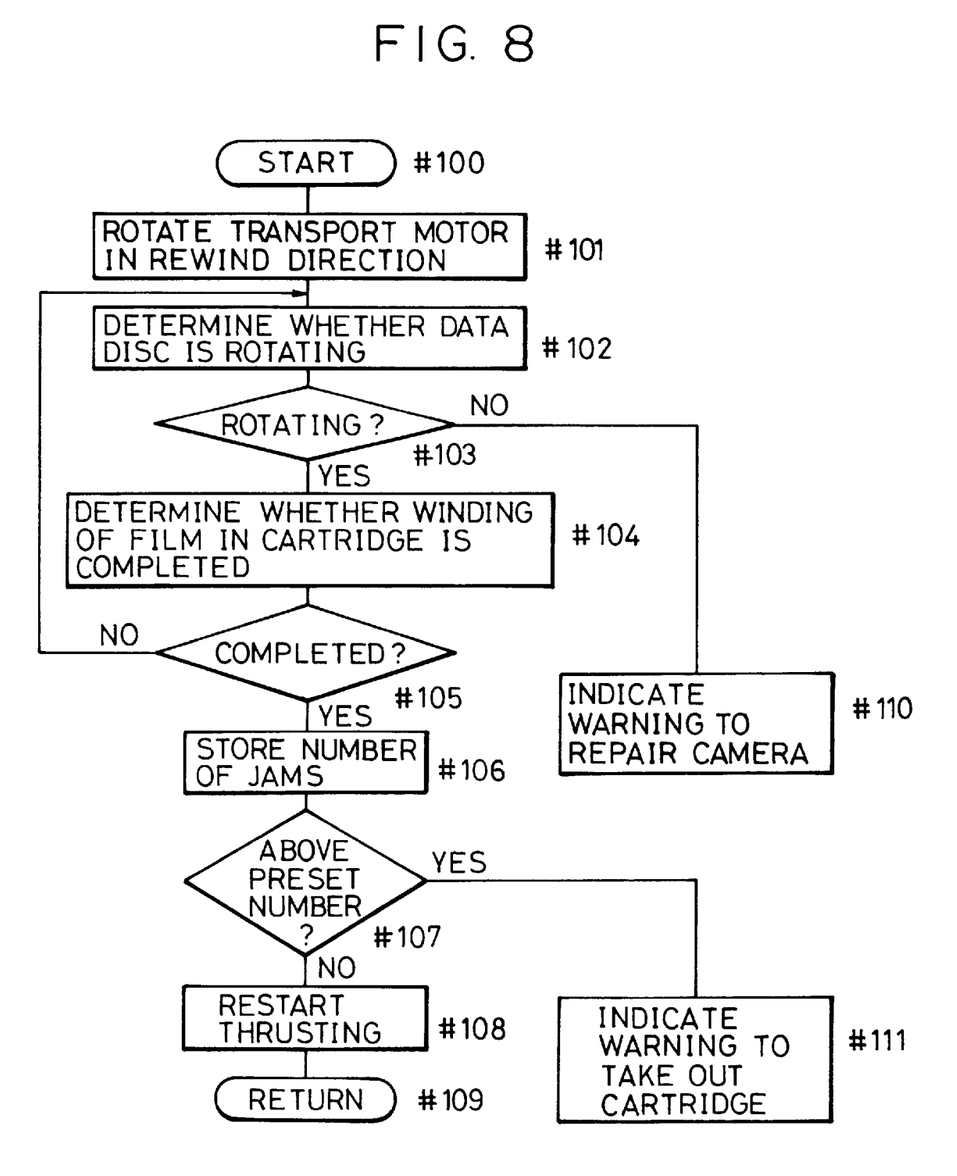
FIG. 8 is a flowchart showing the processing at jam detection in the operation shown in FIG. 7.

FIG. 8 is a flowchart showing the process of error handling (1) in a case in which the film leader could not reach the first photoreflector 4 due to a film jam. Film rewinding is immediately started by rotating the transport motor 7 in the reverse direction (rewind direction) in Step #100. At this time, the rewinding is performed while photoreflector 3 detects in Steps #102 and #103 whether the data disc 22 is rotating. If the data disc 22 is not rotating, although it is almost improbable, the film 13 is caught somewhere due to a jam and rewinding is impossible. Since the cartridge used in this embodiment can be, as distinct from the conventional patrone, taken out of the camera by the user only when the film is completely wound in the cartridge, there is nothing the camera itself can do. In this case, a warning to repair the camera is indicated in Step #110, and other operations of the camera are prohibited. However, in this case, it is better to allow a main switch to be turned off. When the data disc 22 is rotating, it is determined in Steps #104 and #105 whether the film has been wound into the cartridge. After winding is completed, the number of jams which have occurred, including this jam, is stored in a memory or the like of the microcomputer 1 in Step #106. If it is determined in Step #107 that the stored number of jams is larger than a preset number, the user is given a warning to take this film out since it cannot be used. When the number of jams is below the preset number, thrusting is restarted, and the process returns to Step #5 in FIG. 7. If the preset number is set at 0, the cartridge is to be taken out without returning to Step #5 whenever a jam is detected.

Figure 9:
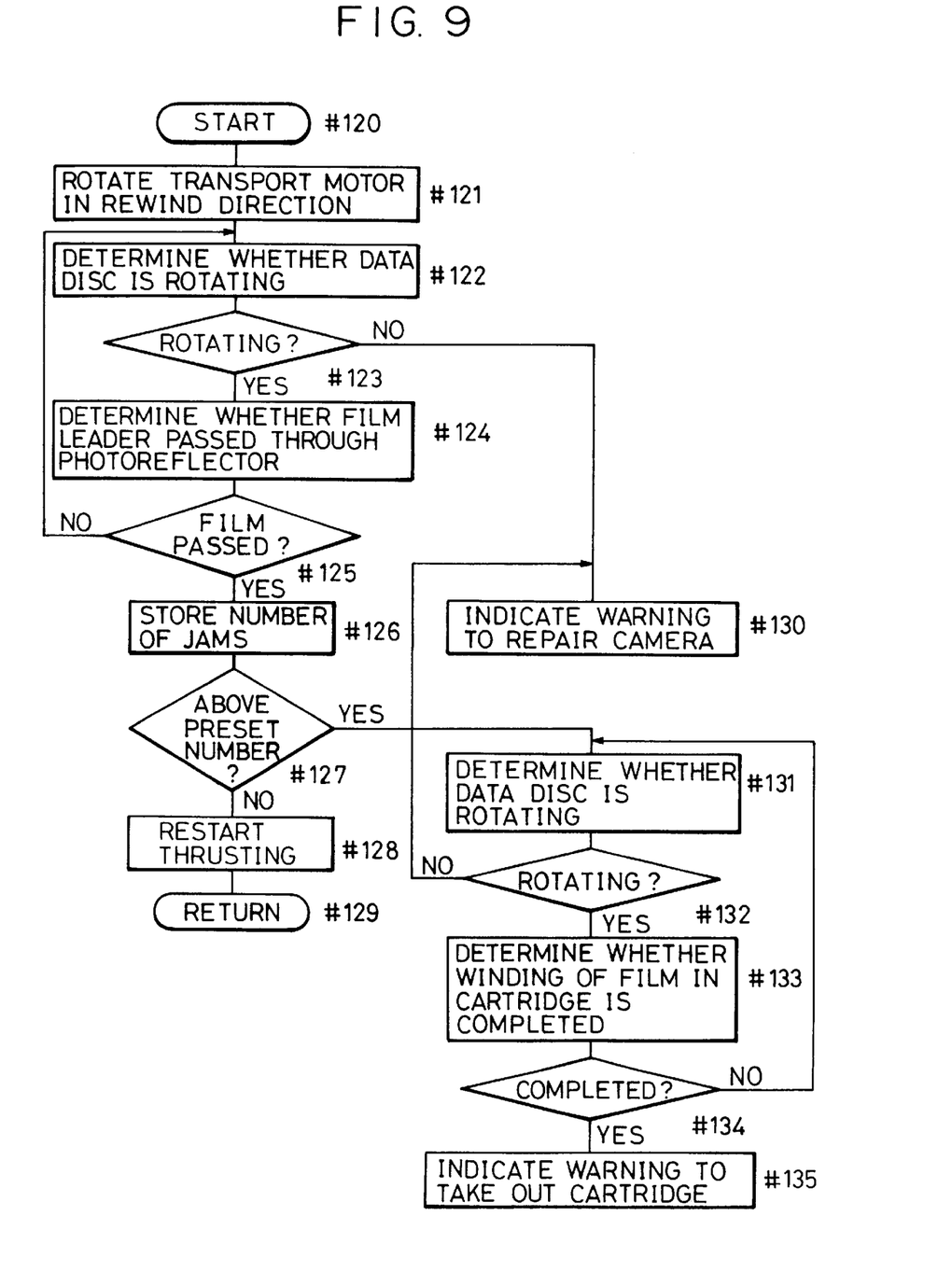
FIG. 9 is a flowchart showing the processing at jam detection in the operation shown in FIG. 7.

FIG. 9 is a flowchart showing the process of error handling in a case in which the occurrence of a jam is detected after the film leader has passed through the second photoreflector 5. Film rewinding is immediately started by rotating the transport motor 7 in the reverse direction (rewind direction) in Step #121. At this time, rewinding is performed while the photoreflector 3 detects in Steps #122 and #123 if the data disc 22 is rotating. If the data disc 22 is not rotating, although it is almost improbable, the film is caught somewhere due to a jam and cannot be rewound. Since the cartridge used in this embodiment can be, as distinct from the conventional patrone, taken out of the camera by the user only when the film is completely wound in the cartridge, there is nothing the camera itself can do. In this case, a warning to repair the camera is indicated in Step #130, and other operations of the camera are prohibited. However, in this case, it is better to allow the main switch to be turned off. When the data disc 22 is rotating, it is determined in Steps #124 and #125 whether the film leader has passed through the photoreflector 4. If the film leader has passed, the number of jams which have occurred in this film, including this jam, is stored in the memory or the like of the microcomputer 1 in Step #126. If it is determined in Step #127 that the stored number of jams is larger than a preset number, the film is wound into the cartridge while seeing if the data disc 22 is rotating in Steps #131 and #132 in the same manner as above. When winding is completed in Step #134, the user is given a warning to take this film out since it cannot be used. If the rotation of the data disc 22 is stopped during the film winding, a warning to repair the camera is indicated in Step #131 similarly to Step #122. When the number of jams is below the preset number, thrusting is performed again, and the process returns to Step #10 or #15 in FIG. 7.

Figure 10:
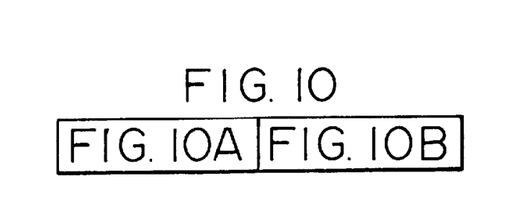
FIG. 10 consisting of FIGS. 10A and 10B, is a flowchart showing the operation of a second embodiment.
Figure 10A:
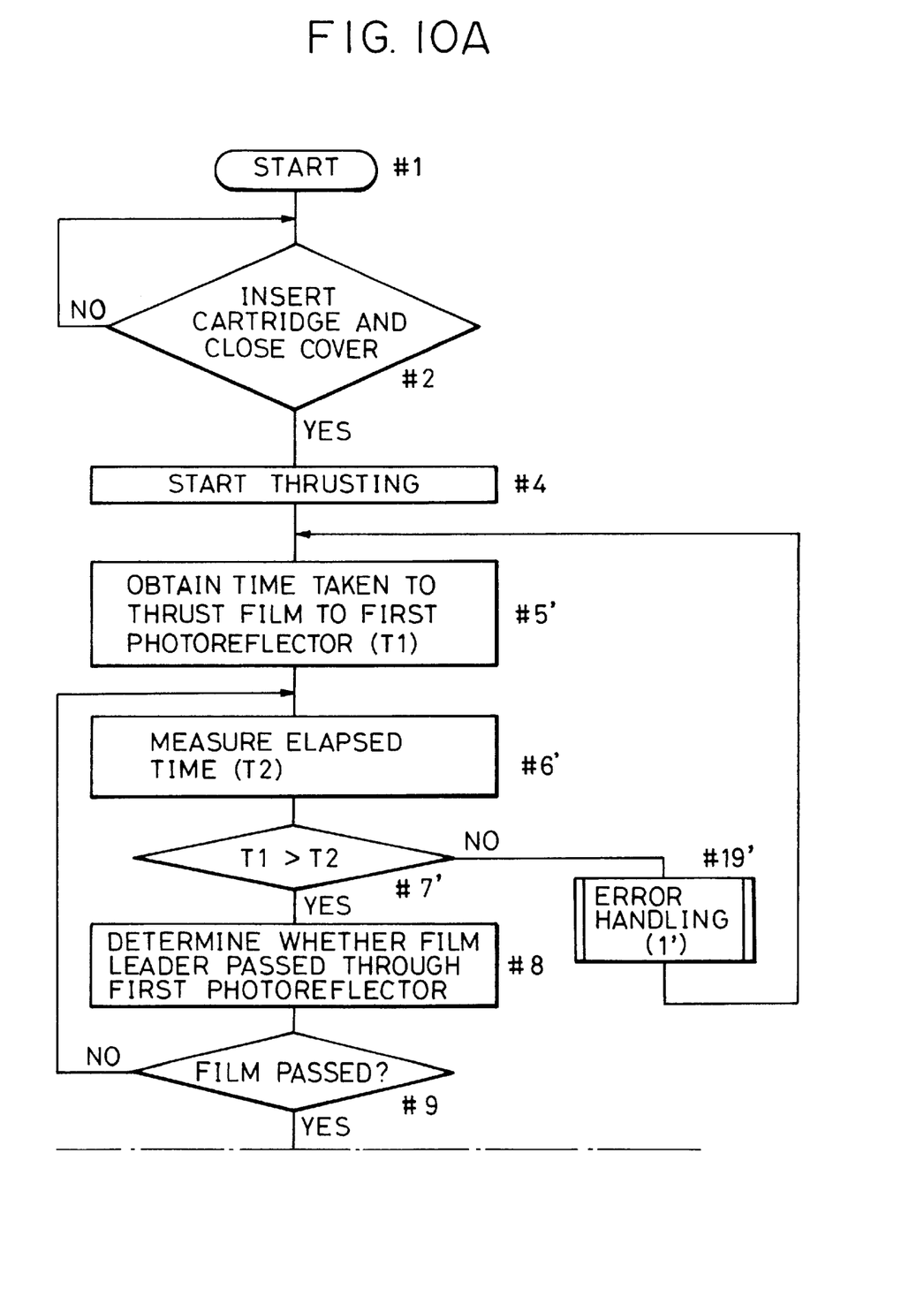
Figure 10B:
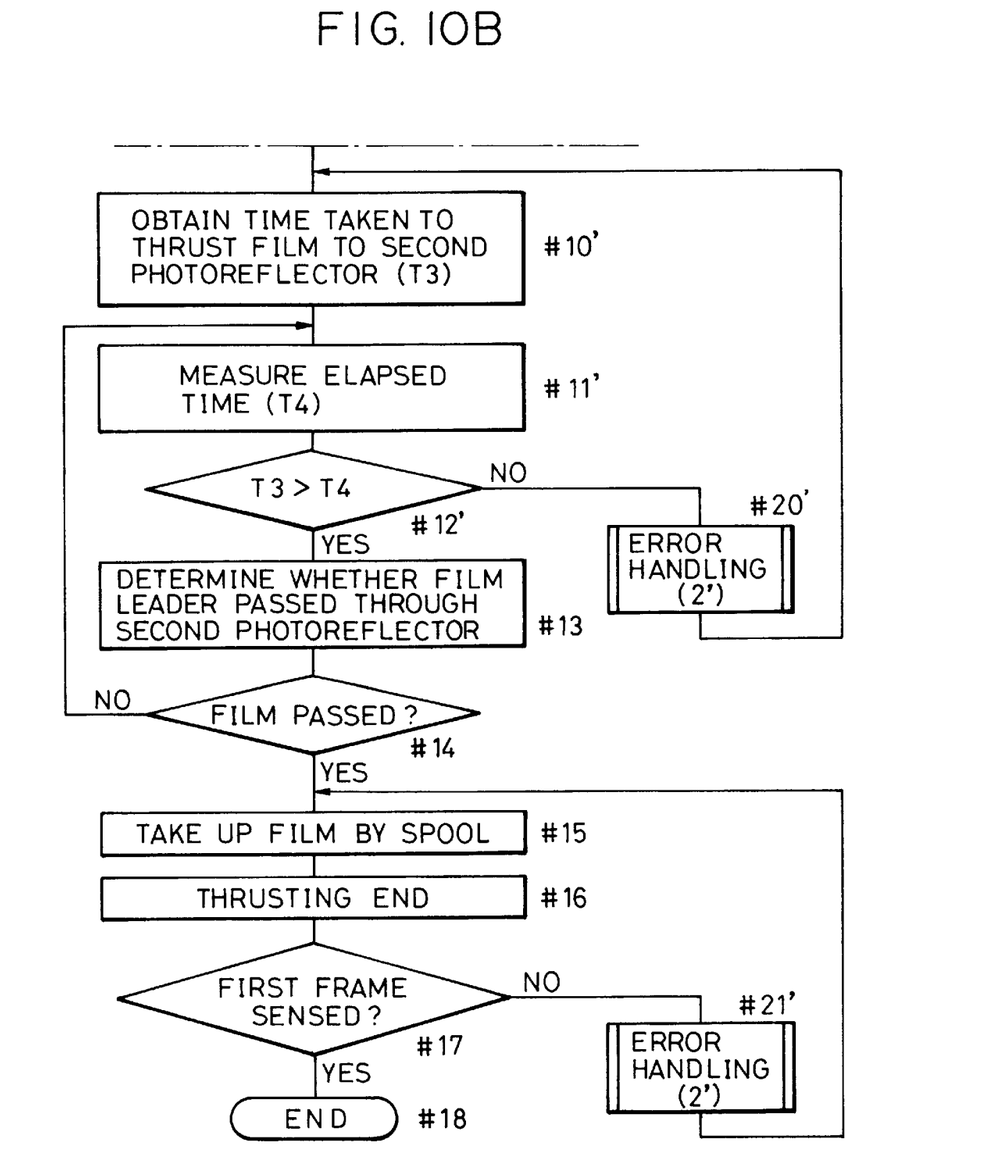

FIG. 10 consisting of FIGS. 10A and 10B, is a flowchart showing an automatic loading operation in a second embodiment of the present invention. In this embodiment, it is assumed that the photoreflector for reading data on the data disc 22 is not provided. After it is confirmed in Step #2 that a cartridge is inserted and the cartridge chamber is closed, thrusting is started by rotating the transport motor 7 in the take-up direction in Step #4. At this time, the transport motor 7 is rotated at constant speed regardless of battery consumption and temperature by duty driving.

While the motor is being rotated (the fork is being rotated at constant speed), the thrust amount of the film needed to make the film reader reach the first photoreflector 4 is obtained in Step #5'. Since the driving time of the motor 7 and the thrust amount of the film are proportional to each other, a probable thrust amount is converted into time, or the thrust time is found from fixed values in a preset table. This predetermined thrust time is taken as T1. In Step #6', the driving time of the motor is measured as T2. If the measured time T2 is longer than the predetermined thrust time T1, it means that the film could not reach due to a jam caused upstream from the first photoreflector 4, and error handling is performed in Step #19'. When it is confirmed in Steps #8 and #9 that the film leader has passed through the photoreflector 4, the motor driving time taken to make the film leader reach the second photoreflector 5 is obtained in Step #10', or read from a fixed value table. The obtained time is taken as a final thrust time T3. In Step #11', an actual driving time of the motor 7 is measured. This driving time is taken as a final measured time T4. If the final measured time T4 is longer than the final thrust time T3, it is judged in Step #12' that the film could not reach the second photodetector due to a jam caused upstream from the photoreflector 5, and error handling is performed in Step #20'. When it is confirmed in Steps #13 and #14 that the film leader has passed through the second photoreflector 5, the take-up spool 12 is rotated to take up the film in Step #15. Thrusting is ended in Step #16, and automatic loading is also ended when the first frame is sensed in Step #17. If the first frame is not sensed, error handling is performed in Step #21'.

Figure 11:
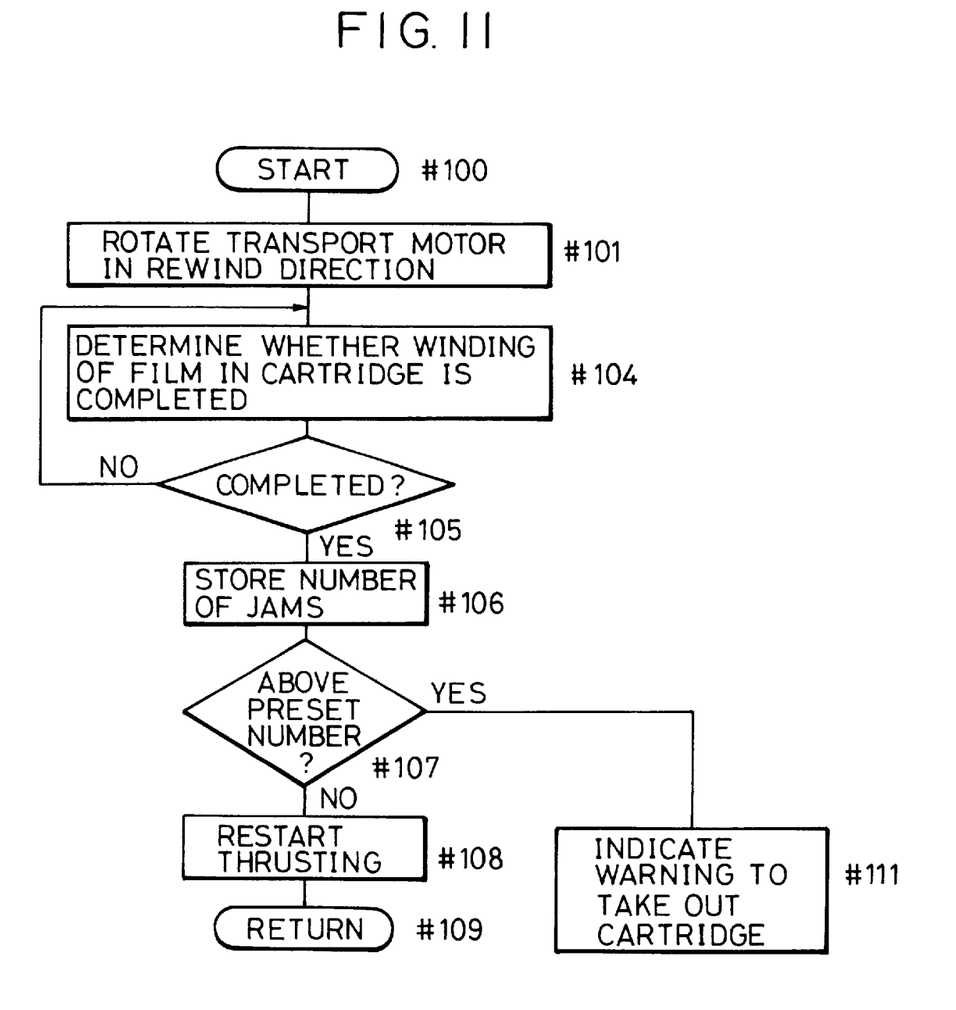
FIG. 11 is a flowchart showing the processing at jam detection in the operation shown in FIG. 10.

FIG. 11 is a flowchart showing the process of error handling in a case in which the film leader could not reach the first photoreflector 4 due to a film jam in the second embodiment. This flowchart is almost the same in sequence as that of FIG. 8, and different in that the rotation of the data disc 22 cannot be detected. Film rewinding is immediately started by rotating the transport motor 7 in the reverse direction (rewind direction) in Step #101. It is determined in Steps #104 and #105 whether the film has been wound into the cartridge. After winding is completed, the number of jams caused in this film, including this jam, is stored in a memory or the like in Step #106. If it is determined in Step #107 the number of jams is larger than a preset value, the user is given a warning to take out this film since it cannot be used. When the number of jams is below the preset value, thrusting is restarted and the process returns to Step #5' in FIG. 10. If the preset value is set at 0, the cartridge is taken out without returning to Step #5' whenever a jam is sensed.

Figure 12:
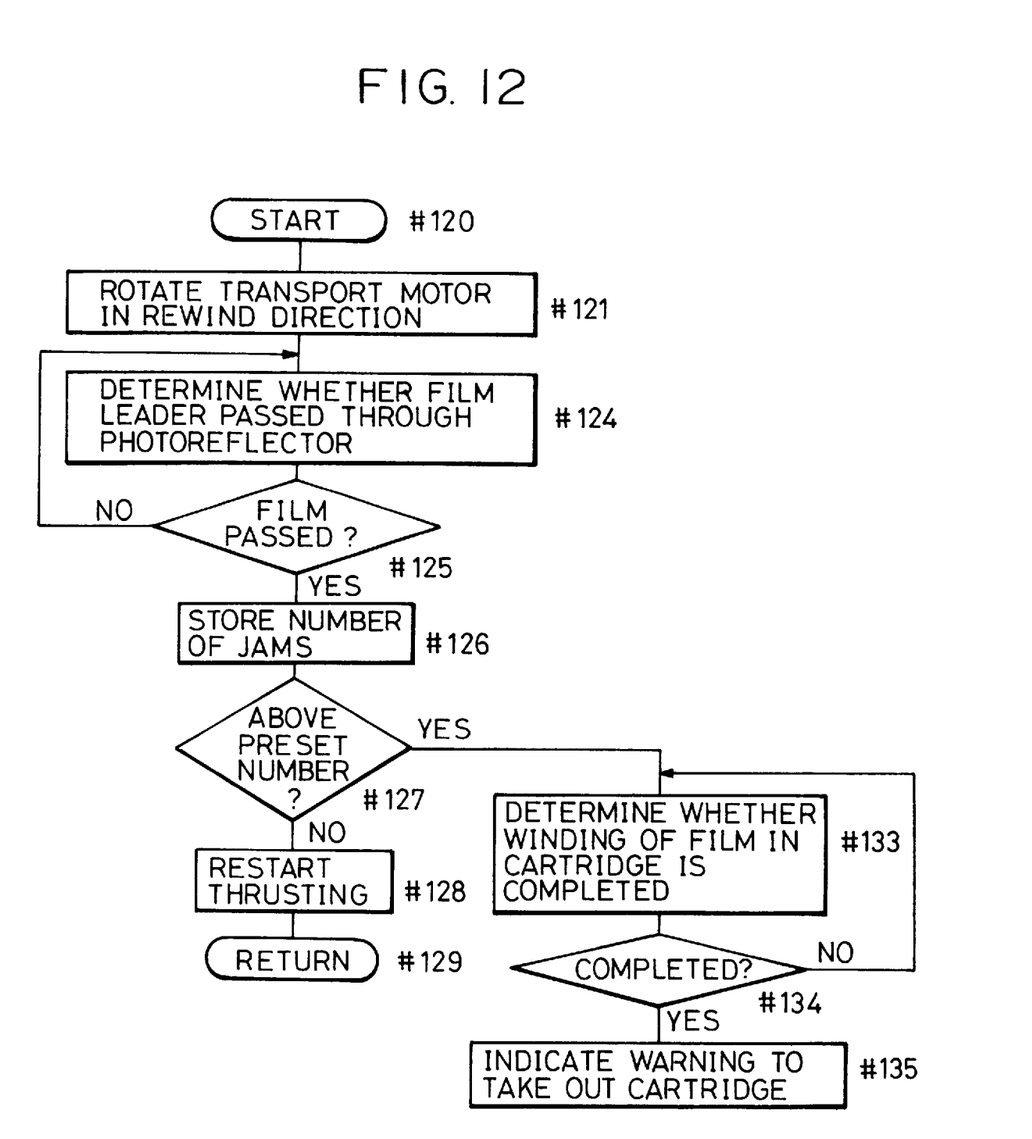
FIG. 12 is a flowchart showing the processing at jam detection in the operation shown in FIG. 10.

FIG. 12 is a flowchart showing the process of error handling in a case in which a jam is detected after the film leader passes through the first photoreflector 4 in the second embodiment. This flowchart is also almost the same in sequence as that of FIG. 8, and different in that the rotation of the data disc 22 cannot be detected. Film rewinding is immediately started by rotating the transport motor 7 in the reverse direction (rewind direction) in Step #121. It is determined in Steps #124 and #125 whether the film leader has passed through the second photoreflector 5. If the film leader has passed, the number of jams caused in this film, including this jam, is stored in a memory or the like in Step #126. When it is determined in Step #127 that the number of jams is larger than a preset value, the film is wound into the cartridge. After winding is completed in Step #134, the user is given a warning to take out this film since it cannot be used. If the number of jams is below the preset value, thrusting is restarted and the process returns to Step #10' or #15 in FIG. 10.

Figure 13:
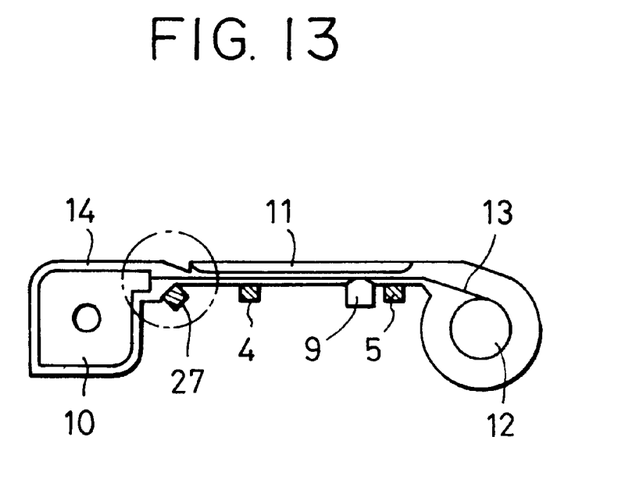
FIG. 13 is a transverse sectional view showing a camera according to a third embodiment of the present invention.
Figure 14A:
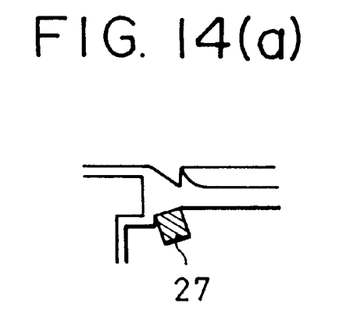
FIGS. 14(a), 14(b), 14(c), and 14(d) are transverse sectional views showing the operation of the third embodiment.
Figure 14B:
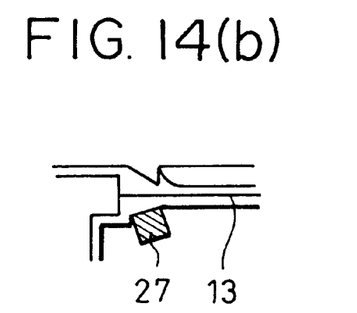
Figure 14C:
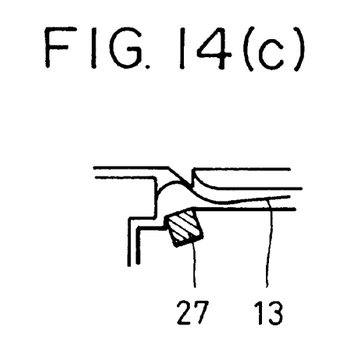
Figure 14D:
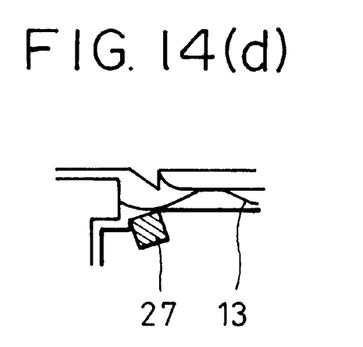

FIGS. 13 to 14(a), 14(b), 14(c), 14(d) show a third embodiment of the present invention. In this embodiment, a photoreflector 27 is added near an exit of a film passing slit of a cartridge 10 as shown in FIG. 13, and connected to a microcomputer in a similar manner to other photoreflectors 3 to 5 in FIG. 1, although not shown in a block diagram. FIG. 14 is an enlarged view of a circled portion in FIG. 13. FIG. 14(a) shows a state in which a film 13 does not protrude from the cartridge 10. At this time, since infrared light emitted from the photoreflector 27 does not return thereto due to the absence of the film 13, which reveals that the film 13 is not out. When thrusting is started and the film 13 comes out of the cartridge 10, since the infrared light is reflected and returned by the film 13, it is known that the film 13 has come out. If the film 13 does not come out, since some accident happens to the cartridge 10, appropriate processing is performed. When the film 13 is thrust normally and inserted between a pressure plate and a guide rail, a state shown in FIG. 14(b) is obtained. However, if the film 13 is caught somewhere, the film 13 is positioned too close to or too apart from the photoreflector 27 as shown in FIG. 14(*c*) or 14(*d*). The photoreflector can sense a jam since no infrared light returns thereto if it is too close to or too apart from an object to be sensed. When the jam is sensed, the processing shown in the flowchart of FIG. 8 is executed.

According to the above-mentioned embodiments, since it can be determined by a means for sensing the passage of the film, for example, an optical sensing means such as a photoreflector whether the film passes in a good condition, it is possible to achieve smaller size and lower cost of the camera than the conventional method of judging the state of automatic loading by detecting the film speed.

Furthermore, the thrust amount of the film needed to make the film leader reach a sensing position can be estimated by utilizing a data disc provided in the film cartridge, and the state of film passage can be judged reliably with a simple structure based on the estimated amount.

Still further, if something is wrong with film thrusting, film rewinding is automatically carried out, and therefore, the user of the camera does not have to perform a special operation. At this time, it is unnecessary to return all the thrust film into the cartridge. For example, by returning the film to a position, where the film passage could be confirmed, and restarting thrusting, the time taken to complete automatic loading can be reduced Furthermore, it is possible to sense that the film is not thrust out of the film cartridge itself.

What is claimed is:

1. A camera including a drive mechanism for rotationally driving a spool in a film cartridge to thrust a film from the film cartridge, the film cartridge including a rotatable data disc that is coaxial with the spool, and that rotates with the spool, the rotatable data disc including film data arranged thereon, said camera comprising:

a detecting mechanism that detects the film data on the data disc of the film cartridge and generates an output signal corresponding to the detected film data;

a sensor that senses a presence of the film thrust from the film cartridge at a predetermined location, and generates an output signal indicating the presence of the film at the predetermined location; and a determining circuit that receives the output signal from said detecting mechanism and the output signal from said sensor, determines a rotation amount of the data disc based on the detected film data, thereby determining an amount of film thrust from the film cartridge, and determines whether the film is advancing properly, based on the determined amount of film thrust and the detected presence of the film by said sensor.

2. A camera according to claim 1, wherein said data disc is provided with bar code information, and said determining circuit determines the rotation amount of the data disc based on detection of said bar code information.

3. A camera according to claim 1, further comprising a film take-up spool, wherein said sensor comprises a first sensing element interposed between the film take-up spool and a loading position of the film cartridge, said first sensing element generates an output that changes when a leader portion of the film arrives thereat, and said sensor senses the position of the leader portion of the film based on the output generated by said first sensor element.

4. A camera according to claim 3, wherein said determining circuit determines a projected position of the leader portion based on the amount of film thrust determined by said determination circuit, and determines that the film is not advancing properly when the protected position of the leader portion is beyond said sensor and the output signal from said sensor does not change.

5. A camera according to claim 4, further comprising, a rewinding circuit for moving said film in a rewind direction when said determining circuit determines that the film is not advancing properly.

6. A camera according to claim 5, further comprising, a driving circuit for driving the drive mechanism to thrust the film again after a rewinding operation by said rewinding circuit.

7. A camera according to claim 5, further comprising, a warning circuit for giving a warning when said rewinding circuit is actuated and rewinding of the film is not achieved.

8. A camera according to claim 1, further comprising a film take-up spool, wherein said sensor comprises a first sensing element and a second sensing element interposed between the film take-up spool and a loading position of the film cartridge, and said first sensing element and said second sensing element each generate a respective output that changes when a leader portion of the film arrives thereat, such that said sensor senses the leader portion at a first position and at a second position, respectively.

9. A camera according to claim 1, further comprising, a rewinding circuit for moving said film in a rewind direction when said determining circuit determines that the film is not advancing properly.

10. A camera according to claim 9, further comprising, a driving circuit for driving the drive mechanism to thrust the film again after a rewinding operation by said rewinding circuit.

11. A camera according to claim 9, further comprising, a warning circuit for giving a warning when said rewinding circuit is actuated and rewinding of the film is not achieved.

12. A camera according to claim 11, wherein said warning circuit uses said detecting mechanism to determine whether rewinding of the film is achieved.

13. A camera according to claim 1, further comprising a film take-up spool, wherein said sensor comprises a first sensing element interposed between the film take-up spool and a loading position of the film cartridge, and a second sensing element located near the loading position and a film passing slit of the film cartridge, said first sensing element generates an output when a leader portion of the film arrives thereat, and said second sensing element generates an output that changes when the leader portion of the film is thrust from the film cartridge.

14. A camera according to claim 1, wherein the film data includes at least information of a number of frames.

\* \* \* \* \*

UNITED STATES PATENT AND TRADEMARK OFFICE
CERTIFICATE OF CORRECTION

PATENT NO. : 6,175,696 B1
DATED : January 16, 2001
INVENTOR(S) : Yuichi Ariga

It is certified that error appears in the above-identified patent and that said Letters Patent is hereby corrected as shown below:

Column 8,
Line 7, "protected" should read -- projected --.

Signed and Sealed this

Twenty-third Day of October, 2001

Attest:

NICHOLAS P. GODICI
Attesting Officer  Acting Director of the United States Patent and Trademark Office